(12) United States Patent
Grandhee

(10) Patent No.: US 7,008,995 B2
(45) Date of Patent: Mar. 7, 2006

(54) CARBOXY RESIN CROSSLINKERS

(75) Inventor: Sunitha Grandhee, Novi, MI (US)

(73) Assignee: BASF Corporation, Southfield, MI (US)

( * ) Notice: Subject to any disclaimer, the term of this patent is extended or adjusted under 35 U.S.C. 154(b) by 698 days.

(21) Appl. No.: 09/965,425

(22) Filed: Sep. 27, 2001

(65) Prior Publication Data

US 2003/0114584 A1 Jun. 19, 2003

(51) Int. Cl.
  *C08J 3/00*   (2006.01)
  *C08K 3/20*   (2006.01)
  *C08L 75/00*  (2006.01)
  *C08L 67/00*  (2006.01)
  *C08L 73/00*  (2006.01)

(52) U.S. Cl. ............ 524/589; 523/400; 524/599; 524/600; 524/606; 524/612; 524/590; 524/840; 525/408; 525/418; 525/419; 525/450; 525/452

(58) Field of Classification Search .......... 524/589, 524/599, 600, 606, 612, 590, 840; 523/400; 525/408, 418, 419, 450, 452
See application file for complete search history.

(56) References Cited

U.S. PATENT DOCUMENTS

| | | | |
|---|---|---|---|
| 3,505,297 A | 4/1970 | Sheetz | 260/78.4 |
| 4,477,624 A | 10/1984 | Waki | 524/736 |
| 4,801,623 A | 1/1989 | Hess et al. | 521/157 |
| 4,868,298 A | 9/1989 | Brinkman | 540/525 |
| 5,371,118 A | 12/1994 | Bolte et al. | 523/412 |
| 5,580,922 A | 12/1996 | Park et al. | 524/733 |
| 5,693,723 A | 12/1997 | Green | 525/481 |
| 5,693,724 A | 12/1997 | Green | 525/481 |
| 5,710,214 A | 1/1998 | Chou et al. | 525/124 |
| 6,103,387 A | 8/2000 | Yamamoto et al. | 428/482 |

FOREIGN PATENT DOCUMENTS

| | | |
|---|---|---|
| EP | 512 710 | 4/1992 |
| EP | 553 702 | 1/1993 |
| EP | 805 186 | 10/1996 |
| WO | WO 91/18071 | 11/1991 |

OTHER PUBLICATIONS

BASF Corporation, et al., International Search Report PCT/US 02/24162, Jul. 23, 2002.
English Abstract for WO 91/18071 on front page of the International Publication.

*Primary Examiner*—Patrick D. Niland

(57) ABSTRACT

Carboxy resins of low equivalent weight per carboxyl group are synthesized by reacting a compound having two or more isocyanate groups with a compound having one hydroxyl group and two or more carboxyl groups. In a preferred embodiment, the compound having isocyanate groups is an isocyanurate derivative of a diisocyanate. The compound having isocyanate groups and the compound having one hydroxyl group and two or more carboxyl groups are reacted under conditions where reaction of carboxyl groups with isocyanate is substantially avoided. In another aspect of the invention, coating compositions are provided that contain in addition to the carboxy resin, a second component having a number of functional groups that are reactive with the carboxyl groups on the carboxy resin.

43 Claims, No Drawings

CARBOXY RESIN CROSSLINKERS

FIELD OF THE INVENTION

This invention relates to crosslinking resins for organic coatings that are carboxy functional. More specifically, it relates to coating compositions containing carboxyl-functional crosslinkers and resins containing functional groups reactive with carboxyl groups.

BACKGROUND OF THE INVENTION

Curable, or thermosettable, coating compositions are widely used in the coatings art, particularly for topcoats in the automotive and industrial coatings industry. Basecoat-clearcoat composite coatings are topcoats that offer exceptional gloss, depth of color, distinctness of image, or special metallic effects. The automotive industry has made extensive use of basecoat-clearcoat composite coatings for automotive body panels. Single layer topcoats and the clearcoats of color plus clear composite coatings usually require an extremely high degree of clarity and gloss to achieve the desired visual effect. Furthermore, they must maintain the clarity and gloss over long periods of time in the face of environmental challenges.

Clearcoat coating compositions used as the outermost automotive coating are subject to damage caused by numerous elements. These elements include environmental fall out, exposure to ultraviolet radiation from sunlight, exposure to high relative humidity at high temperature, and defects made by impacts of small, hard objects resulting in chipping. "Environmental etch" is a term applied to a kind of exposure degradation that is characterized by spots or marks on or in the finish on the coating that often cannot be rubbed out.

In order to be commercially successful, a coating should provide as many favorable characteristics as possible. In addition to etch resistance and resistance to chipping, it is desirable to provide curable coating compositions with favorable viscosity properties so as to exhibit good rheology or sag control. Furthermore, coatings are required which exhibit good properties of intercoat adhesion and which are resistant to defects that occur during the curing process such as popping. Also, it is desirable to provide coatings that maintain their good coating properties at temperatures involved in high bake repair.

Resins for coating compositions are selected by the formulator to provide desirable properties associated with the structure of the resin. Because most resins require curing before development of optimum coating properties, it is usually necessary for the formulator to add a crosslinking agent or resin to the coating composition. The crosslinking resin, in general, contains reactive functional groups that react with the functional groups of the coating resin. In many cases, it is advantageous to provide crosslinking resins that are compatible with the coating resin and that have as high a functionality as possible. Such crosslinkers can be used in relatively small amounts without detracting from the coating properties of the composition.

Crosslinking agents with a low equivalent weight per carboxyl group have not been widely used in the coatings industry because it has been felt that the reactivity and catalytic effect of the carboxyl groups would lead to undesirable coating properties. For example, in U.S. Pat. No. 6,103,387 to Yamamoto et al., thermosetting compositions are provided that include a compound having two or more carboxyl groups blocked by a vinyl ether compound. The carboxyl groups of the compound are blocked so as to increase storage life and reduce reactivity. The patent teaches that when compounds containing carboxyl groups are used to produce topcoating compositions, high solids contents are difficult to achieve and the appearance of the finished coat is inferior.

In U.S. Pat. No. 4,477,624 to Waki, heat resistant synthetic resin compositions are provided that contain a polyamide imide type resin obtained by reacting a diisocyanate with a tricarboxylic acid containing citric acid. The reaction occurs at high temperatures for several hours, so that the carboxyl groups of the tricarboxylic acid react with the isocyanate groups of the diisocyanate.

It would be desirable to provide a crosslinking resin having carboxyl functionality and a low equivalent weight per carboxylic group. It would be further desirable to provide such a crosslinking resin by reaction of a hydroxy functional carboxylic acid with an isocyanate under mild reaction conditions. This invention provides such a solution.

SUMMARY OF THE INVENTION

Carboxy resins of low equivalent weight per carboxyl group are synthesized in one embodiment by reacting a compound having two or more isocyanate groups with a compound having one hydroxyl group and two or more carboxyl groups. In a preferred embodiment, the compound having isocyanate groups is an isocyanurate derivative of a diisocyanate. The compound having isocyanate groups and the compound having one hydroxyl group and two or more carboxyl groups are reacted under conditions where reaction of carboxyl groups with isocyanate is substantially avoided. In another aspect of the invention, coating compositions are provided that contain, in addition to the carboxy resin, a second component having a number of functional groups that are reactive with the carboxyl groups on the carboxy resin.

DETAILED DESCRIPTION OF THE INVENTION

Curable coating compositions are provided according to the invention that contain a carboxy resin and a component containing a plurality of groups that are reactive with the carboxyl groups on the carboxy resin. The carboxy resin is prepared by reacting a polyisocyanate compound with a reactive compound having two or more carboxyl groups and in addition one functional group that reacts with an isocyanate under conditions where a carboxzyl group will not react appreciably with isocyanate. Examples of such functional groups include hydroxyl, amino, and mercaptan, with hydroxyl and amino being preferred. In a preferred embodiment, the polyisocyanate has three isocyanate groups and the reactive compound is hydroxyl-functional. In that case, the carboxy resin is produced by reacting the polyisocyanate with the reactive compound (having one hydroxyl group and two or more carboxyl groups) under conditions where the reaction of isocyanate group with carboxyl group is substantially avoided. Thus, the carboxy resin contains internal urethane linkages and terminal carboxyl groups. The equivalent weight per carboxyl group of the caroboxy resin is preferably less than 200 and more preferably less than 150.

Alternatively, the carboxy resins of the invention can be prepared by reacting the polyisocyanate compound with an amino acid containing an amino group and a plurality of carboxyl groups. When an amino acid is used to prepare the carboxy resin, the carboxy resin contains internal urea groups and terminal carboxyl groups.

The component containing a plurality of groups reactive with the carboxyl groups includes a number of known carboxyl-reactive resins. Such resins contain functional groups known to react with the carboxyl group under curing conditions to provide a crosslinked or thermoset resin. Such functional groups are known to those of skill in the art and include, without limitation, epoxy groups, oxazoline groups, oxazine groups, silanol groups, alkoxysilane groups, hydroxyl groups, amino groups, imino groups, isocyanate groups, blocked isocyanate groups, cyclocarbonate groups, vinyl ether groups, vinyl thioether groups, aminomethylol groups, alkylated aminomethylol groups, acetal groups, and ketal groups. Non-limiting examples of some of the resins noted above are given in the Examples. In general, the carboxy resin is reacted with the component having functional groups reactive with the carboxyl groups under conditions known of those of skill in the art to form covalent linkages between the carboxy resin and the component.

As noted above, in one embodiment the carboxy resin contains internal urethane linkages and a plurality of terminal carboxyl groups; such a carboxy resin is synthesized by reacting a polyisocyanate compound with a compound having a single hydroxyl group and a plurality of carboxyl groups. The latter compounds will be referred to as hydroxy carboxylic acids.

Hydroxy carboxylic acids useful in the present invention include those with a single hydroxyl group. Examples include, without limitation, lactic acid, citric acid, hydroxypivalic acid, 12-hydroxy stearic acid, and malic acid. In a preferred embodiment, the hydroxy carboxylic acid contains three carboxylic groups. In another preferred embodiment, the hydroxy carboxylic acid is citric acid.

In another embodiment, the carboxy resin contains internal urea likages; such carboxy resins are prepared by reacting a polyisocyanate compound with a compound having a single amino group and a plurality of carboxyl groups. These latter compounds will be referred to as amino acids. Amino acids useful for forming the carboxy resin of the invention include, without limitation, glutamic acid, aspartic acid, and iminodiacetic acid.

The polyisocyanate compound used to make the carboxy resin of the invention may be any organic isocyanate containing two or more isocyanate groups. For example, a number of diisocyanate compounds are known, many of which are commercially available. Diisocyanate compounds useful for making the carboxy resin of the invention include, without limitation, 1,11-diisocyanatoundecane, 1,12-diisocyanatododecane, 2,2,4- and 2,4,4-trimethyl-1,6-diisocyanatohexane, 1,3-diisocyanatocyclobutane, 4,4'-bis-(isocyanatocyclohexyl)-methane, hexamethylene diisocyanate, 1,2-bis-(isocyanatomethyl)-cyclobutane, 1,3- and 1,4-bis-(isocyanatomethyl)cyclohexane, hexahydro-2, 4-and/or-2,6-diisocyanatoluene, 1-isocyanato-2-isocyanatomethyl cyclopentane, 1-isocyanato-3-isocyanatomethyl-3,5,5-trimethyl-cyclohexane, 2,4'-dicyclohexylmethane diisocyanate, and 1-isocyanato-4(3)-isocyanatomethyl-1-methyl cyclohexane.

Other suitable diisocyanates include aromatic diisocyanates, such as, without limitation, tetramethyl-1,3- and/or -1,4-xylylene diisocyanate, 1,3- and/or 1,4-phenylene diisocyanate, 2,4- and/or 2,6-toluene diisocyanate, 2,4- and/or 4,4'-diphenyl-methane diisocyanate, 1,5-diisocyanatonaphthalene, and p-xylylene diisocyanate. Mixtures of the above diisocyanates may also be used, as may mixtures of diisocyanates with the triisocyanates described below.

Suitable diisocyanates are also understood to include those containing modification groups such as biuret, uretdione, isocyanurate, allophanate and/or carbodiimide groups, as long as they contain two or more isocyanate groups.

In a preferred embodiment, the polyisocyanate compound used to make the carboxy resin of the invention contains three isocyanate groups. A convenient source of triisocyanate functional compounds is the known isocyanurate derivative of diisocyanates. Isocyanurate derivatives of diisocyanates can be made by reacting the diisocyanate together with a suitable trimerization catalyst. An isocyanurate derivative is produced that contains an isocyanurate core with pendant organic chains terminated by three isocyanate groups. Several isocyanurate derivatives of diisocyanates are commercially available. In one preferred embodiment, the isocyanurate used is the isocyanurate of isophorone diisocyanate. In another preferred embodiment, the isocyanaurate of hexamethylene diisocyanate is used.

The carboxy resins of the invention are made by reacting a polyisocyanate compound with a reactive compound containing carboxylic acid groups as noted above. The polyisocyanate compound and the reactive compound are reacted with or without catalyst, and with or without solvents. The reaction conditions are chosen so that reaction between isocyanate and carboxyl groups is substantially avoided. For example, it is preferred to carry out the reaction at 100° C. or less to minimize reaction of the carboxyl groups with the isocyanates. In a preferred embodiment, the reaction is carried out at about 50° C. or less, and it may be advatageously carried out at or near room temperature. The stoichiometric ratio of the reactants is chosen so that the ratio of isocyanate equivalents on the polyisocyanate to hydroxyl or amino equivalents on the reactive compound (for example, the hydroxy carboxylic acid or amino acid) is very close to 1 to 1. In addition to avoiding the unwanted reaction of carboxyl group with isocyanate, the above conditions also reduce or eliminate cross reaction of the hydroxy carboxylic acid or amino acid with itself to form polyesters or polyamides.

The product of the reaction of the polyisocyanate compound with the preferred amino acid or hydroxy carboxylic acid is a carboxy resin with an equivalent weight per carboxyl group of preferably less than 200. For example, when the polyisocyanate compound is the isocyanurate of isophorone diisocyanate and the hydroxy carboxylic acid is citric acid a carboxy resin is produced that has an equivalent weight of about 146 per carboxyl group. When the polyisocyanate compound is the isocyanurate of hexamethylene diisocyanate, the carboxy resin made from citric acid has an equivalent weight of about 129 per carboxyl group.

The carboxy resin of the invention is predominantly carboxyl-functional and can in general react with any coating component having functional groups reactive with carboxyl groups, such as those noted above. In one embodiment, the coating resin can be an epoxy latex resin. Such epoxy resins can be synthesized by reacting a number of olefinically substituting monomers together, at least one of which includes epoxy functionality. For example, a suitable monomer containing epoxy functionality is provided by the well known glycidyl esters of acrylic or methacrylic acid. In general, the monomers are polymerized under radical polymerization conditions to yield polymers containing a polyolefin backbone and a number of functional groups including epoxy groups pendant from the backbone. An example of the synthesis of an epoxy latex for use in the coating compositions of the invention is given below in Example 1.

In another embodiment, the component that reacts with the carboxy resin contains oxazoline or oxazine functional groups. Polymers that contain oxazoline functional groups are available commercially for example, from Nippon Shokubai. In addition, preparation of polymers containing the oxazoline groups and the related oxazine groups are described in U.S. Pat. No. 3,505,297 to Sheetz, the disclosure of which is hereby incorporated by reference. The curing reaction of the oxazoline (n=1) or oxazine (n=0) functional group with a carboxyl group is given by the formula

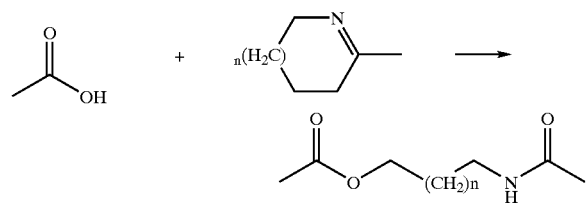

The oxazoline group can react with a carboxyl group rapidly at a temperature of about 80–100° C. At room temperature, the reaction can proceed slowly. The reactivity of the oxazoline group with carboxyl group is about as high as or higher than that of epoxide, melamine, or blocked isocyanate. An example of a coating composition made from the carboxy resin of the invention and an oxazoline functional resin is given in Example 2.

In another embodiment, the component having functional groups reactive with the carboxyl groups of the carboxy resin is selected from among the well known aminoplast resins. Examples include, without limitation, amino resins obtained by the reaction of amines such as melamine or urea with aldehydes such as formaldehyde. In addition, the amino resins may be partially or completely alkylated and may contain varying levels of 2-ring, 3-ring, and higher ring content. An example of the use of a melamine resin together with the carboxy resin of the invention is given below in Example 3.

In another embodiment, the compound containing groups that react with a carboxy resin of the invention is monofunctional and reacts with the carboxy resin to form an alkyd. For example, in a preferred embodiment, the carboxy resin is reacted with an epoxy compound containing one epoxy group. Examples of useful epoxy compounds include, without limitation, glycidyl esters and glycidyl ethers.

Glycidyl esters can be prepared by reacting a monofunctional carboxylic acid (e.g., octanoic acid, benzoic acid, benzylic acid, cyclohexane carboxylic acid) with an epihalohydrin (e.g., epichlorohydrin) under conditions well-known in the art. In a preferred embodiment, the monofunctional carboxylic used to produce the glycidy esters is a branched neo-acid such as, without limitation, neodecanoic or neononanoic acid. Glycidyl esters are commercially available, e.g., as Cardura® E from Shell Oil Company, Glydexx® N-10 from Exxon, or Araldite® PT910 from Ciba-Geigy. Glycidyl esters may be described by the formula:

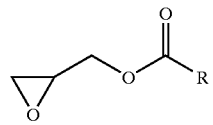

wherein R is a hydrocarbon group of from 1 to about 40 carbon atoms, preferably from about 1 to about 20 carbon atoms, and most preferably from about 1 to about 12 carbon atoms. This hydrocarbon group may be substituted, as is known in the art.

Another useful class of monoepoxides is glycidyl ethers. Glycidyl ethers can be prepared by the reaction of monofunctional alcohols (e.g., n-butanol, propanol, 2-ethylhexanol, dodecanol, phenol, cresol, cyclohexanol, benzyl alcohol) with an epihalohydrin (e.g., epichlorohydrin). Useful glycidyl ethers include, without limitation, the glycidyl ether of 2-ethylhexanol, the glycidyl ether of dodecanol, the glycidyl ether of phenol, and the like. These compounds are commercially available, for example, under the Erisys® product family from CVC Specialties.

Examples of a coating composition prepared from the reaction product of a carboxy resin with Cardura E epoxy resin is given in Example 4. The use of the mono-functional epoxy resin leads to flexibility in synthesizing the coating compositions of the invention. For example, if the carboxy resin is fully derivatized by reacting with epoxy group, a hydrophobic resin is produced that is soluble in organic solvents and useful for solvent borne primers basecoats and clearcoats. On the other hand, when less than all of the carboxy groups are reacted with epoxide, that is, with less than complete derivatization, unreacted carboxyl groups are left on the resin of the invention. The carboxyl groups can be partially or completely neutralized, for example, with amine to form a water dispersible resin useful in water borne primers basecoats or topcoats such as clearcoats.

Coating compositions can be prepared by combining the carboxy resin of the invention with a second component or components having functional groups reactive with the carboxyl groups of the carboxy resin. The coating compositions may also contain pigments to provide paints that can be used as primers, basecoats, and/or topcoats. In addition to the carboxy resin and the second component, the compositions of the invention may further include other resins and/or crosslinking systems that have functional groups that can cure with one another, with the functional groups of the carboxy resin, or with the functional groups of the second component. In some embodiments, the third resin or resins provides a major source of crosslinking functional groups, with the carboxy resin providing a minor amount relative to the third resin. In such an embodiment, the carboxy resin of the invention may be thought of as an additive to a conventional resin system, where the carboxy resin provides a minor amount, for example from about 5 to about 50%, of the reactive equivalent in the crosslinking system of the coating composition. An example of using the carboxy resin of the invention to replace in this manner 5% and 10% respectively by weight of a major hydroxy functional latex resin is given below in Example 5. Such compositions can be applied to substrates and cured according to methods known to those of skill in the art. They are further illustrated in the non-limiting examples given below.

A solvent may optionally be utilized in the coating composition used in the practice of the present invention. The coating composition according to the present invention can be applied without solvent. However, in many cases, it is desirable to use a solvent in the coating system as well. The solvent should be compatible both with the carboxy resin and with the component containing reactive groups reactive with the carboxyl groups of the carboxy resin. In general, the solvent can be any organic solvent and/or water. In one embodiment, the solvent is a polar organic solvent. Examples include, without limitation, ketones, esters, acetates, aprotic amides, aprotic sulfoxides, and aprotic amines. Examples of useful solvents include, without limitation, methyethyl ketone, methylisobutyl keytone, amyl acetate, ethylene glycol butylether acetate, propylene glycol monomethyl ether acetate, xylene, N-methylpyrrolidone, and blends of aromatic hydrocarbons. In another embodiment, the solvent can be water or a mixture of water with co-solvents. When water is used as the solvents, it may be preferred to at least partially neutralize the carboxyl groups of the carboxy resin. The carboxyl groups may be neutralized, for example, with strong or weak Bronsted-Lowry bases, or with Lewis bases such as amines. By using water as a solvent, it is possible to formulate coating compositions having low levels of volatile organic compound emissions (VOC).

The coating composition used in the practice of the invention may include a catalyst to enhance the cure reaction. For example, when aminoplast compounds are reacted with the carboxy resin of the invention, a strong acid catalyst may be used to enhance the cure reaction. Such catalysts are well known in the art and include for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

Additional agents, for example, surfactants, fillers, stabilizers, wetting agents, thickeners, dispersing agents, adhesion promoters, UV absorbers, HALS, etc. may be incorporated into the coating composition.

Coating compositions can be coated on the article by any of a number of techniques well-known in the art. These include, for example, spray coating, dip coating, roll coating, curtain coating, and the like. The coatings can be cured at about 200° F. to 350° F. for a period of about 10 to 60 minutes.

In one embodiment, the coating composition according to the invention is utilized in a high-gloss coating and/or as the clearcoat of a composite color-plus-clear coating. High-gloss coatings as used herein are coatings having a 20° gloss (ASTM D523-89) or a DOI (ASTM E430-91) of at least about 80. In other preferred embodiments, the coating composition may be utilized to prepare high-gloss or low-gloss primer or enamel coatings.

In another embodiment, the coating composition of the invention can be formulated as aqueous primers with low VOC. When such primers are applied to a substrate, the coated substrate exhibits good resistance to damage resulting from the impact of small projectiles such as stones. One measure of the resistance to damage is given by numeric ratings in tests such as the GM Gravelometer Test.

The invention has been described above with respect to some preferred embodiments. Further non-limiting examples of the practice of the invention are given in the following examples.

EXAMPLES

Preparative Reaction A: Synthesis of the Adduct of Isocyanurate with Citric Acid 210 g (0.28 moles) of the isocyanurate of isophorone diisocyanate, 164 g (0.28 moles) of citric acid, and 248 g of N-methylpyrrolidone were weighed into a 3 liter flask and heated to 80° C. The mixture was stirred at 80° C. for three hours and then cooled to 50° C. 142 g of a 95% aqueous solution of 2-amino-2-methyl-1-propanol was added and mixed well for a few minutes followed by the addition of 227 g of deionized water. The percent non-volatiles of the resulting carboxy resin was 51.72% The acid number was 155 mg KOH/g. The viscosity of the carboxy resin was 100 centipoise (cps).

Preparative Reaction B: Synthesis of Epoxy Latex

Deionized water 576 g was loaded into a 5-liter flask and heated to 82° C. A pre-emulsion was made with 382.1 g of methyl methacrylate, 80 g of butyl acrylate, 7.26 g of styrene, 258.28 g of glycidyl methacrylate, 79.88 g of Abex EP-110 (30% aqueous solution supplied by Rhodia) and 574 g of deionized water. Initiator solution was made using 2.63 g of ammonium persulfate and 39.6 g of deionized water. When the temperature of the water in the flask stabilized at 82° C., the pre-emulsion and initiator solution was added separately and simultaneously over three hours. The reaction mixture was held at 82° C. for two hours, cooled at 45° C., and filtered using 100 micron silk.

Preparative Reaction C: Synthesis of Hydroxy Functional Latex

Deionized water, 28.8 parts, was loaded to a reaction vessel. The water was heated to 82° C. with medium stirring under an atmosphere of nitrogen. In another mixing vessel, 24.14 parts deionized water, 4 parts anionic surfactant, 14.8 parts methyl methacrylate, 13.8 parts butyl acrylate, 10.2 parts hydroxyethyl methacrylate, 1.2 parts acrylic acid, and 0.12 parts polymerization catalyst were added and mixed for 15 minutes to form an emulsion. The emulsion was added over a period of three hours to the water in the first reactor. Thereafter the mixture was held at 82° C. for two hours. Then the reaction mixture was cooled to room temperature and 1.97 parts deionized water was added. The reaction mixture was filtered and stirred. The percent nonvolatiles was 41%, the hydroxyl number was 510 mg KOH/g, and the $T_g$ was 20° C.

Comparative Example 1

Film Made from Carboxy Resin

A 2 mil film was drawn onto a glass plate using the carboxy resin prepared in Preparative Example A. The film was baked at 250° F. for 30 minutes. The cure characteristics of the film were tested by rubbing with a cheesecloth in methyl ethyl ketone (MEK). The drawn film exhibited only 20 MEK rubs.

Example 1

Reaction of the Citric Acid Adduct with Epoxy-Latex 7.74 g of the carboxy resin made in Preparative Example A (equivalent weight 146.37) was mixed with the epoxy latex synthesized in Preparative Example B (weight per epoxy 39.47) at varying ratios of 1:1, 1:0.5, 1:0.25; 1:0.125. A clear film was obtained with the 1:1 mixture. When relatively less of the carboxy resin was used so that the ratio of latex to carboxy resin was greater than 1:1, partially clear to cloudy to powdery were obtained as demonstrated in the Table.

| Latex | Carboxy Resin | Appearance of Film |
|---|---|---|
| 1 | 1 | clear film |
| 1 | 0.5 | partially clear, rest of film was cloudy |
| 1 | 0.25 | cloudy |
| 1 | 0.125 | powdery |

Example 2
Reaction of Carboxy Resin with Oxazoline Polymer 3.25 g of the carboxy resin prepared in Preparative Example A (equivalent weight 146.37 per carboxyl group) was mixed with 2.86 g of Epocross WS-500 (an oxazoline polymer commercially available from Nippon Shokubai (40% non-volatile, equivalent weight 130) and 1 g deionized water. The total solids of the mixture was 40%. The solution was mixed well. A 3 mil film of the solution was drawn onto a glass plate and baked at 250° F. for 30 minutes. A glossy film was obtained. The cure characteristics of the film were tested by rubbing with an MEK soaked cheesecloth. More than 200 rubs was obtained.

Example 3
Reaction of Carboxy Resin with Melamine Resin 10.5 g of the carboxy resin of Preparative Example A (equivalent weight per carboxyl group 146.37), 6.1 g Resimene-747 (liquid hexamethoxy melamine supplied from Solutia) and 4.0 g of methyl ethyl ketone was mixed well to give a solution with 57% solids. The solution was drawn onto a glass plate to a thickness of 2 mils. The film was baked at 250° F. for 30 minutes. A glossy film was obtained. The cure characteristics of the film were tested by rubbing with an MEK soaked cheesecloth. More than 200 rubs were obtained.

Example 4
Reaction of Carboxy Resin with Monofunctional Epoxide

Example 4a
Pot Synthesis 74.1 g of the isocyanurate of isophorone diisocyanate, 67.6 g of citric acid, and 87.8 g of N-methylpyrrolidone were added to a 1 liter flask and heated to 80° C. Approximately 30 minutes after the temperature reached 80° C., 205.2 g of Cardura®, E10 was added and the drop in acid number was monitored. 1 g of DABCO® was added to catalyze the reaction. The temperature of the reaction mixture was maintained at 90° C. for another 6 hours until the acid number dropped to almost 0 (acid number equals 3). The absorbed solids for the product was 62.67%.

Example 4b
Reaction of Carboxy Resin with Cardura E10

161.81 g (81.39% non-volatile, 0.1 moles) of an adduct prepared by the reaction of 74.1 g of isophorone diisocyanate isocyanurate with 57.58 g of citric acid and 30 g of NMP was mixed with 205.2 g (0.9 moles of Cardura® E10 and heated at 82° C. The temperature was raised to 117° C. and heated until the acid number dropped to almost 0 (acid value 2). The dark brown reaction mixture was cooled. The percent non-volatiles of the reaction product was 91.7%, the viscosity was 325 cps.

Example 5
Preparation of Water-based Primer Paints

Water-based primers were formulated according to the recipes given in the Table.

| | Component | Example 5a | Example 5b |
|---|---|---|---|
| 1 | Latex resin | 224.65 | 237.15 |
| 2 | Melamine crosslinker | 14.2 | 15 |
| 3 | carboxy resin | 22.7 | 11.35 |
| 4 | defoamer | 5 | 5 |
| 5 | surfactant | 0.1 | 0.1 |
| 6 | Propylene glycol | 1 | 1 |
| 7 | thickener | 2.5 | 2.5 |
| 8 | titanium dioxide | 41.1 | 41.1 |
| 9 | pigment extender | 41.1 | 41.1 |
| 10 | carbon black | 0.2 | 0.2 |
| 11 | Water | 147.45 | 145.5 |

Component 1 is the latex resin prepared in Preparative Reaction C. Component 2 is a commercial melamine crosslinker such as, for example, RUO 586 available commercially from Monsanto. Component 3 is a carboxy resin of the invention prepared in Preparative Reaction A.

Components 1 through 11 were added slowly under agitation in a stainless steel pot mill. Media were added and the mixture was mixed at 1200 rpm for 2.5 hrs at 18–22° C. The resulting paint was filtered with a 50 micron filter and a 1 mil dry film was Siphon sprayed. The film was flashed at 140° F. for 7 minutes and baked for 15 minutes at 275° F. A primer-coated substrate was produced.

Example 6

The primer paint formulations of Examples 5a and 5b were applied onto steel substrates, and baked under a variety of time and temperature conditions. Results showing film properties and chip resistance are given in the Table in Examples 6a–6f. The film thickness is given in the mils and the 60 gloss represents the gloss at 60°. All of the paint compositions tested exhibited 200 or more MEK rubs, indicating that they are suitable for use as coating compositions. Chip resistance is given in the Table under the column labeled GM Gravelometer. The number in the GM Gravelometer column represents the rating of the test system in the well known GM Gravelometer test. In the test, the primer coating formulations of Examples 5a and 5b were coated onto steel substrates and the primer coat was top-coated with a conventional solvent-borne base coat and top coat system. The ratings of 4 and 5 in the GM Gravelometer test indicate that the paint system exhibits acceptable chip resistance.

| Example No. | Paint | Bake (F) Total Time | Film Thickness | 60 Gloss | MEK Rubs | GM Gravelometer |
|---|---|---|---|---|---|---|
| 6a | Ex 5a | 15' × 275° F. | 0.8 | 48 | 200 | 4 |
| 6b | Ex 5a | 30' × 275° F. | 0.9 | 50 | 200 | 4 |
| 6c | Ex 5a | 30' × 325° F. | 0.9 | 48 | 200 | 4 |
| 6d | Ex 5b | 15' × 275° F. | 1.1–1.3 | 65 | 200 | 5 |
| 6e | Ex 5b | 30' × 275° F. | 1.2–1.4 | 63 | 200 | 5 |
| 6f | Ex 5b | 30' × 325° F. | 1.1–1.3 | 60 | 200 | 5 |

What is claimed is:

1. A coating composition comprising:
   (A) a carboxyl functional component that is an optionally partially neutralized reaction product of
      (1) a polyisocyanate having two or more isocyanate groups, and
      (2) a reactive compound having two or more carboxyl groups, and one functional group selected from the group consisting of hydroxyl, amino, and mercaptan; and (B) a component comprising a plurality of groups that are reactive with the carboxyl groups on the carboxyl functional component, wherein the reactive groups are selected from the groups consisting of oxazoline groups and oxazine groups.

2. A composition according to claim 1, wherein the reactive compound has three carboxyl groups.

3. A composition according to claim 1, wherein the reactive compound has one hydroxyl group.

4. A composition according to claim 1, wherein the reactive compound has one amino group.

5. A composition according to claim 1, wherein the polyisocyanate has three isocyanate groups.

6. A composition according to claim 1, wherein the polyisocyanate comprises an isocyanurate of a diisocyanate.

7. A composition according to claim 1, wherein the polyisocyanate comprises an isocyanurate of a diisocyanate selected from the group consisting of isophorone diisocyanate, hexamethylene diisocyanate, and combinations thereof, and the reactive compound comprises citric acid.

8. A composition according to claim 1, wherein Component (B) comprises oxazoline groups.

9. A composition according to claim 1, wherein component B comprises oxazine groups.

10. A composition according to claim 1, wherein Component (B) comprises an amino resin.

11. A composition according to claim 10, wherein the amino resin comprises a melamine formaldehyde resin.

12. A composition according to claim 1, wherein Component (B) comprises epoxy groups.

13. A composition according to claim 12, wherein Component (B) comprises copolymer of a glycidyl ester of acrylic or methacrylic acid.

14. A composition according to claim 1, further comprising water.

15. A composition according to claim 1, further comprising an organic solvent.

16. A coating composition, comprising an alkyd component that is the reaction product of:
  (A) a carboxyl functional component that is an optionally partially neutralized reaction product of
    (1) a polyisocyanate having two or more isocyanate groups, and
    (2) a reactive compound having two or more carboxyl groups, and one functional group selected from the group consisting of hydroxyl, amino, and mercaptan; and
  (B) a component comprising one epoxy group.

17. A composition according to claim 16, wherein Component (B) comprises a glycidyl ester of a carboxylic acid.

18. A composition according to claim 16, wherein Component (B) comprises the glycidyl ester of neodecanoic acid.

19. A composition according to claim 16, further comprising water.

20. A composition according to claim 16, further comprising an organic solvent.

21. A composition according to claim 16, wherein the polyisocyanate has three isocyanate groups, and the reactive compound has three carboxyl groups.

22. A coating composition, comprising:
  a carboxyl-functional component comprising urethane groups, and having an equivalent weight per carboxyl group of 200 or less; and
  a second component comprising a plurality of functional groups selected from the group consisting of oxazine groups and oxazoline groups.

23. A composition according to claim 22, wherein the equivalent weight is about 150 or less.

24. A composition according to claim 22, wherein the carboxyl-functional component comprises a reaction product of a polyisocyanate and a reactive compound, the reactive compound having one hydroxyl group and two or more carboxyl groups.

25. A composition according to claim 24, wherein the polyisocyanate comprises an isocyanurate of a diisocyanate.

26. A composition according to claim 25, wherein the polyisocyanate comprises an isocyanurate of a diisocyanate selected from the group consisting of isophorone diisocyanate, hexamethylene diisocyanate, and combinations thereof.

27. A composition according to claim 22, wherein the second component comprises oxazoline groups.

28. A composition according to claim 22, wherein the second component comprises oxazine groups.

29. A composition according to claim 22, wherein the second component comprises epoxy groups.

30. A composition according to claim 22, wherein the second component comprises an amino resin.

31. A composition according to claim 22, further comprising water.

32. A composition according to claim 22, further comprising an organic solvent.

33. A composition according to claim 22, further comprising a pigment.

34. A paint composition comprising:
  (A) a carboxy resin having carboxyl functional groups and an equivalent weight per carboxyl group of 200 or less;
  (B) at least one component comprising a plurality of functional groups selected from the group consisting of oxazine and oxazoline groups; and
  (C) a pigment.

35. A composition according to claim 34, wherein the pigment comprises a non-metallic pigment.

36. A composition according to claim 34, wherein the pigment comprises a metallic pigment.

37. A composition according to claim 34, comprising a water borne composition.

38. A composition according to claim 34, comprising a solvent-borne composition.

39. A composition according to claim 34, wherein the equivalent weight is 150 or less.

40. A composition according to claim 34, wherein the carboxy resin comprises urethane groups.

41. A composition according to claim 34, wherein the carboxy resin is the reaction product of:
  (1) a polyisocyanate having two or more isocyanate groups; and
  (2) a reactive compound having two or more carboxyl groups, and one functional group selected from the group consisting of hydroxyl, amino, and mercaptan.

42. A composition according to claim 34, wherein the carboxy resin is the reaction product of:
  (1) an isocyanurate of a diisocyanate; and
  (2) a reactive compound having three carboxyl groups and one functional group selected from the group consisting of hydroxyl, amino, and mercaptan.

43. A method of coating a substrate, comprising:
  (1) applying a composition according to claim 34 to the substrate; and
  (2) curing the composition on the substrate.

* * * * *